United States Patent [19]

Lassiaz et al.

[11] Patent Number: 4,660,701
[45] Date of Patent: Apr. 28, 1987

[54] ASSEMBLY OF A CLUTCH RELEASE BEARING, ESPECIALLY FOR A MOTOR VEHICLE

[75] Inventors: Philippe Lassiaz, Boulogne; Bernard Mallet, Wittelsheim, both of France

[73] Assignee: Valeo, Paris, France

[21] Appl. No.: 598,819

[22] Filed: Apr. 10, 1987

[30] Foreign Application Priority Data

Apr. 11, 1983 [FR] France ................. 83 05848

[51] Int. Cl.⁴ ............................................. F16D 23/14
[52] U.S. Cl. .................................. 192/98; 192/110 B; 192/70.13
[58] Field of Search .................... 192/98, 110 B, 89 B, 192/70.13

[56] References Cited

U.S. PATENT DOCUMENTS 4,228,882 10/1980 Huber et al. ........................... 192/98
4,271,950 6/1981 Kolb et al. ................... 192/110 B X
4,502,583 3/1985 Limbacher ................... 192/70.13 X

FOREIGN PATENT DOCUMENTS 2639766 3/1976 Fed. Rep. of Germany .
2613952 10/1977 Fed. Rep. of Germany .
2304826 10/1976 France .
2533280 3/1984 France .
2533651 3/1984 France .
2538060 6/1984 France .
2062799 5/1981 United Kingdom .
2076100 11/1981 United Kingdom .................. 192/98

Primary Examiner—Rodney H. Bonck
Assistant Examiner—Alan G. Towner
Attorney, Agent, or Firm—Charles E. Brown; Charles A. Brown

[57] ABSTRACT

According to this assembly, the means of fixing in terms of traction, which are used between the engagement piece (25) of the clutch release bearing (10) and the gripping piece (13) attached to the disengaging device (11) to be controlled, comprise, on the one hand, a fixing ring (32) engaged in a retaining groove (33) provided in the engagement piece (25) and, on the other hand, a driving bearing surface (34) provided on the gripping piece (13).

According to the invention, that flank of the retaining groove (33) which is axially located on the side opposite the driving bearing surface (34) in relation to the fixing ring (32) is oblique relative to the axis of the unit as a whole.

The invention is used, in particular, for clutch release bearings of motor vehicles.

13 Claims, 8 Drawing Figures

4,660,701

ASSEMBLY OF A CLUTCH RELEASE BEARING, ESPECIALLY FOR A MOTOR VEHICLE

The present invention relates, in general terms, to clutch release bearings, especially for motor vehicles.

It is aimed, more particularly, at those clutch release bearings which, called drawn bearings, are intended for acting by traction on the disengaging device of the clutch to be controlled and which must be coupled to the latter for this purpose.

To this end, it has been proposed, in some assemblies of clutch release bearings, particularly in the assembly of a clutch release bearing described in the French Patent filed on 19th Mar. 1975 under No. 75/08,514 and published under No. 2,304,826, to utilize, between the clutch release bearing and the disengaging device to be controlled, a piece, called a "gripping piece" or "active piece" here simply for the sake of convenience, which, being suitably attached to the said disengaging device, incorporates radially, on the side of the latter opposite the clutch release bearing, a bearing collar by means of which it is designed to act on it in cooperation with means of fixing in terms of traction which, provided between such a gripping piece and a piece, called an engagement piece here for the sake of convenience, and belonging to the clutch release bearing, are designed to make an axial connection between the said pieces in the axial direction extending from the disengaging device to the said clutch release bearing.

In practice, in French Patent No. 2,304,826 mentioned above, the means of fixing in terms of traction, which are utilized, consist, in general, of a coupling member deformable elastically in a radial direction, which is carried by one of the pieces to be fixed in terms of traction and which is intended to interact as an abutment with a driving bearing surface provided substantially transversely for this purpose on the other piece.

The advantage of such an arrangement is, in particular, that it makes it possible to equip the disengaging device of the clutch to be controlled with the gripping piece in advance, even before the corresponding clutch mechanism is fitted, and subsequently to ensure, when the unit as a whole is assembled, that the clutch release bearing engages with the said gripping piece simply by being snapped in.

In some of the embodiments proposed in French Patent No. 2,304,826 mentioned above, the elastically deformable coupling member used is an annular piece provided obliquely with fingers deformable elastically in a radial direction.

Although such a coupling member is satisfactory, it has the disadvantage of being relatively costly and of requiring a considerable force to fit it.

In other embodiments described in French Patent No. 2,304,826 mentioned above, the coupling member is an annular ring, called a "fixing ring" here simply for the sake of convenience, which is at least partially engaged radially in an annular retaining groove provided for it in one of the pieces to be fixed in terms of traction, the other piece incorporating the driving bearing surface with which it is to interact to achieve such fixing.

The fixing ring used in this way can consist, for example, of a split ring of circular cross-section, which possesses in places and in alternating sequence, on the one hand, rectilinear portions, by means of which it is locked without play with the bottom of the retaining groove in which it is engaged, along a circle of relatively reduced radius and, on the other hand, circular portions of relatively larger radius, by means of which it is designed to interact with the corresponding driving bearing surface.

However, as before, such a fixing ring requires substantial force to fit it.

Alternatively, the fixing ring used can consist of a simple split elastic ring of circular contour and of quadrangular cross-section, which is engaged with play in the associated retaining groove.

However, such an elastic split ring of quadrangular cross-section is relatively costly.

Furthermore, in both cases, the frustoconical engagement bearing surface, which the piece having the driving bearing surface must incorporate to compel such a fixing ring to pass from its configuration of rest to a more restricted engagement configuration, may have to be relatively extended in an axial direction to the detriment of the axial bulk of the unit as a whole if, for such a configuration of rest, the fixing ring itself has a substantial extension diametrically.

This is all the more so because it is customary, for reasons of safety, to give the driving bearing surface a relatively firm hold on the piece to which it is assigned.

Moreover, this is the reason why, to reinforce such a hold, the fixing ring has a quadrangular cross-section in some of the embodiments proposed in French Patent No. 2,304,826 mentioned above.

The subject of the present invention is, in general terms, an arrangement making it possible to overcome these difficulties in a very simple way, whilst allowing a fixing ring which is itself simple and inexpensive to be used.

More specifically, the subject of the present invention is an assembly of a clutch release bearing of the type comprising, for coupling a clutch release bearing to the disengaging device of a clutch, a piece, called a gripping piece for the sake of convenience, which is suitably attached to the said disengaging device, and means of fixing in terms of traction which, provided between the gripping piece and a piece, called an engagement piece here for the sake of convenience and belonging to the clutch release bearing, are designed to make an axial connection between the said pieces in the axial direction extending from the disengaging device to the said clutch release bearing, the said means of fixing in terms of traction comprising, on the one hand, an annular ring deformable elastically in a radial direction, called a fixing ring, which is at least partially engaged radially in an annular retaining groove provided for it in the engagement piece, and, on the other hand, a driving bearing surface which is provided substantially transversely on the gripping piece and with which the said fixing ring interacts axially as an abutment in the axial direction in question, such an assembly of a clutch release bearing being characterized, in general terms, in that that flank of the retaining groove which is axially on the side opposite the driving bearing surface in relation to the fixing ring is substantially oblique relative to the axis of the unit as a whole, moving away from the other flank of the said retaining groove as it diverges from the said axis.

Thus, during operation, that is to say when the clutch release bearing exerts by means of its engagement piece a pull on the gripping piece and via this on the disengaging device of the clutch to be controlled, the fixing ring taking effect axially between the said pieces is systematically stressed in the direction of the driving bearing surface with which it is to interact, in such a way that the hold of the latter on the piece to which it is assigned can be relatively reduced, without the need to provide for this purpose a special configuration for the said fixing ring.

In practice, such a fixing ring can in a very simple and very economical way be a ring of circular contour and of circular cross-section.

It must be emphasized, moreover, that, in the attempt to subject the fixing ring to an oblique bearing surface, the solution coming quite naturally to a person skilled in the art is consequently to profile the driving bearing surface with which this fixing ring is to interact, on the understanding that it is conventionally accepted that it is simpler to make any groove, and in this particular case the associated retaining groove, with straight flanks.

However, it emerges in practice that with such an assembly the clutch release bearing is not snapped onto the gripping piece reliably, especially when carried out quickly.

In fact, the snapping-in of the clutch release bearing requires, in practice, initial engagement of this clutch release bearing beyond its final position and subsequently its retraction up to the latter, and during this retraction of the clutch release bearing the fixing ring can be forced back in its retaining groove by the driving bearing surface associated with it, the latter then stressing it in the direction of the bottom of the said retaining groove.

This does not arise in the arrangement which is the subject of the present invention, because on the contrary this makes it possible to execute such a snapping-in action reliably without incorrect operation and without faults.

Moreover, the characteristics and advantages of this invention will emerge from the following description given by way of example, with reference to the attached diagrammatic drawings in which.

Figure 1:
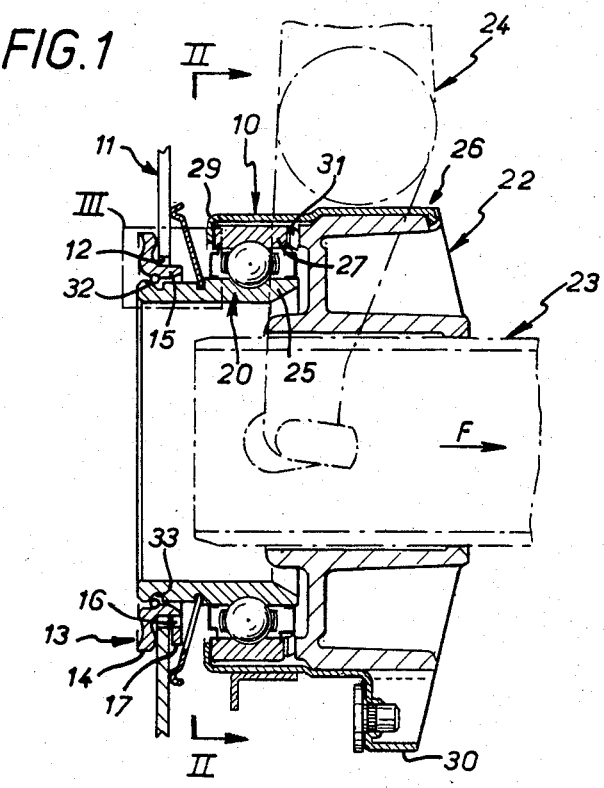
FIG. 1 is a view in axial section of an assembly of a clutch release bearing according to the invention, along the broken line I—I of FIG. 2.
Figure 3:
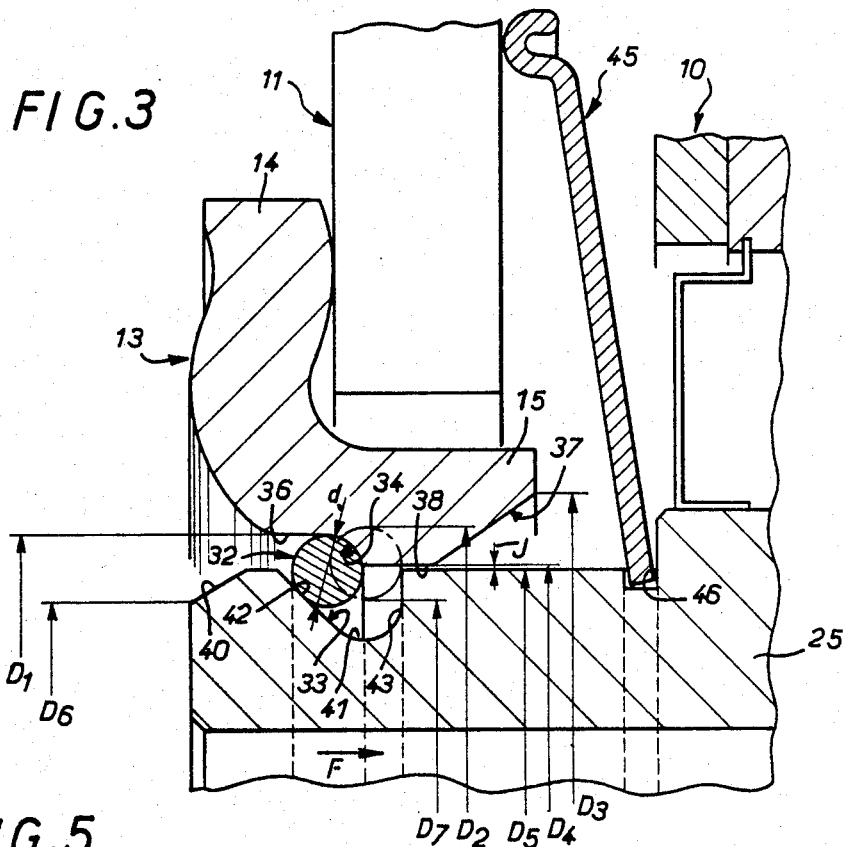
Figure 5:
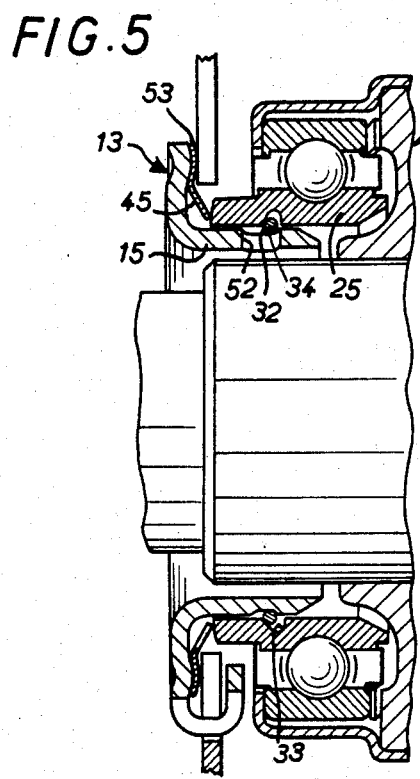

FIG. 3 repeats, on a larger scale, the detail of FIG. 1 identified by an inset III in the latter;

FIGS. 4A, 4B, 4C and 4D are views which, repeating that of FIG. 3 on a smaller scale, illustrate the engagement of the clutch release bearing with the gripping piece provided for this purpose on the disengaging device in question, when the unit as a whole is assembled;

FIG. 5 shows, on a different scale, a partial view in axial section similar to that of FIG. 1 and relating to an alternative embodiment.

As illustrated in these Figures, a clutch release bearing 10 is to be coupled to the disengaging device 11 of any clutch to be controlled.

In the embodiment illustrated more particularly, the disengaging device 11 is formed, in a way known per se, by the end of the radial fingers of a diaphragm, that is to say of an annular piece, which, belonging to the clutch to be controlled, comprises a circularly continuous peripheral part forming a Belleville washer, to stress this clutch in terms of engagement, and a central part fragmented into such radial fingers, to constitute such a disengaging device.

In a way likewise known per se, to couple the clutch release bearing 10 to the disengaging device 11, as is necessary for a pulling action of this clutch release bearing 10 on this disengaging device 11, a piece 13, called a gripping piece here for the sake of convenience, is attached to the latter by means of a central orifice 12 which it incorporates.

In the embodiments illustrated, this gripping piece or active piece is of the type described in the French Patent Application filed on 23rd Sept. 1982 under No. 82/16,045.

Since such a gripping piece does not form part of the present invention, it will not be described in detail here.

It will suffice to indicate that, on the side of the disengaging device 11 opposite the clutch release bearing 10, it incorporates radially a collar 14, called a bearing collar, for acting on such a disengaging device 11, the said bearing collar being suitably profiled for this purpose, and that it incorporates, in one piece with this bearing collar 14, a casing 15 which, extending substantially axially, passes axially through the disengaging device 11 by means of the central orifice 12 in the latter and at the end of which, on the same side as the clutch release bearing 10, there project radially at intervals lugs 16 which carry circumferentially and overhanging, in line with the bearing collar 14 and substantially parallel to this, retaining fingers 17 designed to ensure, in interaction with this bearing collar 14, that the unit as a whole is retained axially on the disengaging device 11.

As described in French Patent Application No. 82/16,045 mentioned above, such a gripping piece 13 can be installed on the disengaging device 11 in a very simple way as a result of the temporary axial bending of the end of as many fingers of the disengaging device 11 as this gripping piece 13 has retaining fingers 17, and then by rotating the gripping piece 13 about the axis of the unit as a whole so as to bring these retaining fingers 17 in line with those fingers of the disengaging device 11 which are adjacent to the previously bent fingers of the latter, before these are released.

In the embodiments illustrated, the axial casing 15 of the gripping piece 13 extends substantially rectilinearly.

The clutch release bearing 10 per se also is not part of the present invention.

Figure 2:
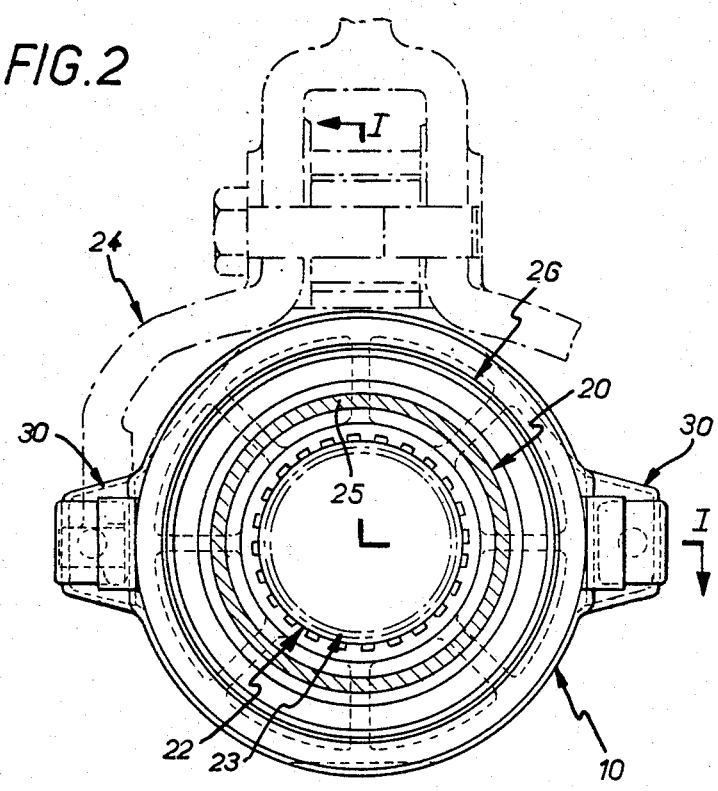
FIG. 2 is a cross-sectional view of the clutch release bearing which this assembly incorporates, along the line II—II of FIG. 1.

In a way known per se, it comprises substantially an engagement element 20, via which it is designed to act on the disengaging device 11 by means of the gripping piece 13, as described in detail below, an actuating element 22, by means of which it is intended, in the embodiments illustrated, to be mounted so as to slide axially on any guide member 23 and by means of which it is designed, moreover, to be actuated by a control member 24 consisting, for example, as indicated by broken lines in FIGS. 1 and 2, of a clutch fork, and coupling means which secure the said engagement element 20 axially to the said actuating element 22.

In a way also known per se, in the embodiments illustrated the engagement element 20 consists of a ball bearing.

To interact with the gripping piece 13, it incorporates a piece 25, called an engagement piece here for the sake of convenience.

In the embodiments illustrated, this engagement piece 25 consists of the inner race of this ball bearing, this being sufficiently extended axially in the direction of the disengaging device 11 for this purpose.

In the embodiments illustrated, and according to arrangements of the type described in the French Patent Application filed on 22nd Sept. 1982 under No. 82/15,962, the coupling means securing the engagement element 20 axially to the actuating element 22 consist of a casing 26 which, being integral axially with the actuating element 22 and surrounding the latter, extends beyond the outer race 27 of the ball bearing forming the engagement element 20 and possesses an angled portion 29 at the end of this outer race.

Furthermore, this casing forms laterally two arms 30 positioned diametrically opposite one another, for the action of the control member 24.

Since, in practice, the embodiments illustrated relate to a self-centered clutch release bearing with self-centering being maintained, a play is left free annularly between the casing 26 and the ball bearing forming the engagement element 20, and there take effect between the outer race 27 of the latter and the actuating element 22 axially acting elastic means consisting, for example, as illustrated, of a corrugated washer 31 of the type sold under the brand name "ONDUFLEX".

Since these arrangements are well known per se and do not form part of the present invention, they will not be described in any more detail here.

In a way likewise known per se, between the engagement piece 25 of the clutch release bearing 10 formed in this way, on the one hand, and the gripping piece 13 carried by the disengaging device 11, on the other hand, there are means of fixing in terms of traction, which are designed to make an axial connection between the said pieces in the axial direction which, as indicated by the arrow F in FIGS. 1 and 3, goes from the said disengaging device 11 to the said cLutch release bearing 10.

Since the gripping piece 13 incorporates a casing 15 axially and since the latter is coaxial with the engagement piece 25, the said means of fixing in terms of traction are provided between this casing 15 and this engagement piece 25.

In the embodiment illustrated particularly in FIGS. 1 to 4, the engagement piece 25 is engaged in the casing 15 of the gripping piece 13, so that these means of fixing in terms of traction take effect between the outer surface of the said engagement piece 25 and the inner surface of the said casing 15.

In general terms, they comprise, on the one hand, an annular ring 32 deformable elastically in a radial direction, called a fixing ring here for the sake of convenience, which is at least partially engaged radially in an annular groove 33, called a retaining groove here for the sake of convenience, provided for it in the engagement piece 25, and, on the other hand, a driving bearing surface 34 which is provided substantially transversely on the gripping piece 13 and with which the said fixing ring 32 is intended to interact axially as an abutment in the axial direction in question, that is to say in the axial direction identified by the arrow F in FIGS. 1 and 3.

In the embodiment illustrated more particularly in FIGS. 1 to 4, the driving bearing surface 34 is provided on the axial casing 15 of the gripping piece 13.

In practice, the fixing ring 32 is a simple ring of circular contour and of a cross-section which is curved and, for example, as illustrated, circular.

It can be, for example, a metal ring opened radially by means of a slit.

It can also be a ring deformable elastically in a radial direction.

Figure 4A:
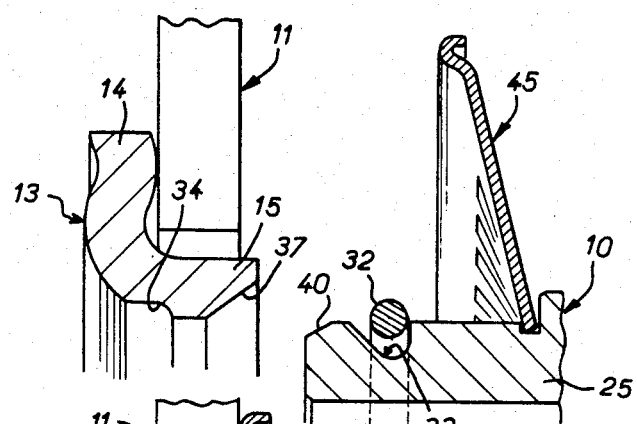

At all events, in the embodiment illustrated in FIGS. 1 to 4, at rest it occupies a configuration in which it largely projects from the retaining groove 33 with which it is associated, whilst remaining in engagement with it, as indicated by broken lines in FIG. 3 and as can be seen in the form of solid lines in FIG. 4A, and it is designed to be elastically deformed radially in the direction of the axis of the unit as a whole, starting from this configuration of rest.

Substantially, the driving bearing surface 34 which the gripping piece 13 possesses is turned towards the bearing collar 14 of the latter, that is to say on the side opposite the clutch release bearing 10.

In the embodiment illustrated in FIGS. 1 to 4, this is a profiled driving bearing surface, that is to say a driving bearing surface, the profile of which in cross-section is complementary to that of the fixing ring 32.

In other words, in this embodiment, the driving bearing surface 34 is a toric bearing surface, the cross-section of which is substantially in the form of a quarter circle.

At all events, it follows a substantially cylindrical bearing surface 36 of the casing 15 of the gripping piece 13, being located at the end of this cylindrical bearing surface 36 and being connected tangentially to the latter.

Of course, the diameter D1 of this cylindrical bearing surface 36 of the casing 15 of the gripping piece 13 is less than that D2 of the overall outer contour of the fixing ring 32 in the configuration at rest.

On the same side as the clutch release bearing 10, the casing 15 of the gripping piece 13 forms, with the end of its inner surface, a frustoconical engagement bearing surface 37, the concavity of which faces the said clutch release bearing 10.

Thus, this frustoconical engagement bearing surface 37 extends from an entry end, on the same side as the clutch release bearing 10, the diameter D3 of this entry end being greater than the outside diameter D2 of the fixing ring 32 in the configuration of rest, to an opposite end, on the same side as the associated bearing collar 14, the diameter D4 of which is slightly greater than that D5 of the outer surface of the engagement piece 25 of the said clutch release bearing 10.

In practice, in the embodiment illustrated, the inner surface of the casing 15 of the gripping piece 13 has, between its frustoconical engagement bearing surface 37 and its driving bearing surface 34, a substantially cylindrical bearing surface 38 of diameter D4.

In a similar way, the engagement piece 25 of the clutch release bearing 10 possesses, at its free end, a frustoconical engagement bearing surface 40 which extends from an entry end, of a diameter D6 less than that D7 of the overall inner contour of the fixing ring 32 in the configuration of rest, to an opposite end of diameter D5.

According to the invention, that flank 42 of the retaining groove 33 which is axially on the side opposite the driving bearing surface 34 of the gripping piece 13 in relation to the fixing ring 32 is substantially oblique relative to the axis of the unit as a whole, moving away from the other flank 43 of this retaining groove 33 as it diverges from the said axis.

In the embodiment illustrated in FIGS. 1 to 4, the oblique flank 42 which the retaining groove 33 thus possesses is that flank of this retaining groove which is axially furthest away from the actuating element 22.

The slope of this oblique flank 42 is preferably between 30° and 60°.

For example, it is in the region of 45°, as illustrated.

In the embodiment illustrated in FIGS. 1 to 4, the bottom 41 of the retaining groove 33 moreover has, in cross-section, a curved profile complementary to that of the fixing ring 32, consequently a substantially semicircular profile, and its oblique flank 42 is connected tangentially to it; its other flank 43 is straight.

At all events, the depth of the retaining groove 33, counting from the outer surface of diameter D5 of the engagement piece 25 to which it is assigned is at least equal to the diameter d of the cross-section of the fixing ring 32 minus the unavoidable annular assembly play J=D4-D5 to be provided between this engagement piece 25 and the casing 15 of the gripping piece 13.

In practice, the fixing means formed in this way have associated with them axially acting elastic means designed to stress the fixing ring 32 permanently in the direction of the driving bearing surface 34 with which it is to interact.

In the embodiment illustrated in FIGS. 1 to 4, and as described in French Patent Application No. 82/21,054 mentioned above, these elastic means consist of an elastic washer 45 having a central part which is fragmented into radial fingers and by means of which it bears axially on the engagement piece 25 of the clutch release bearing 10, for example being engaged by means of its edge in a groove 46 provided for this purpose in the outer surface of the said engagement piece, as illustrated, and a circularly continuous peripheral part, by means of which is bears axially on the disengaging device 11 on the side of the latter opposite the bearing collar 14 of the gripping piece 13, this circularly continuous peripheral part being profiled for this purpose with a rounded cross-section for such a bearing action.

In addition to stressing the fixing ring 32 in the direction of the driving bearing surface 34, this elastic washer 45 also ensures that the bearing collar 14 of the gripping piece 13 is retained elastically against the disengaging device 11, and consequently, because of the corresponding contact friction, this washer also fixes the clutch release bearing 10 in terms of rotation on the gripping piece 13 and via this on the disengaging device 11.

The clutch release bearing 10 is coupled to the disengaging device 11 in the following way.

Since the gripping piece 13 is in place on this disengaging device 11, the fixing ring 32, on the one hand, and the elastic washer 45, FIG. 4A, on the other hand, are installed in advance on the clutch release bearing 10, and, more specifically, on the engagement piece 25 of the latter, the fixing ring 32 being installed in retaining groove 33 provided for this purpose.

As is easy to understand, it becomes easier to install the fixing ring 32 on the engagement piece 25 because of the frustoconical engagement bearing surface 40 which the latter possesses for this purpose.

Figure 4B:
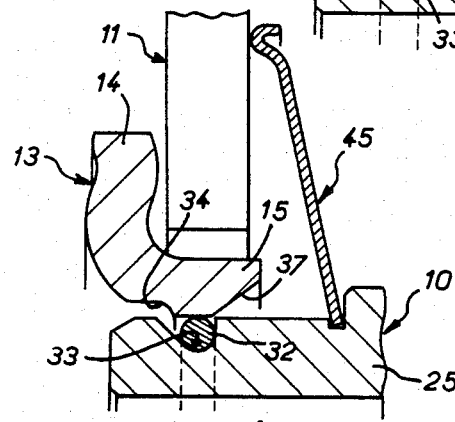

The clutch release bearing 10 and the gripping piece 13 are then brought axially closer to one another, the engagement piece 25 of this clutch release bearing 10 engaging in the casing 15 of this gripping piece 13, FIG. 4B.

Bearing in mind the unavoidable assembly plays between the gripping piece 13 and the disengaging device 11, the said gripping piece 13 is then driven axially in a limited way by the clutch release bearing 10, until by means of its retaining fingers 17 it comes up against the face of the disengaging device 11 turned towards the clutch release bearing 10 (not shown in the Figures).

In conjunction with this, because of the frustoconical engagement bearing surface 37 of the gripping piece 13, the fixing ring 32 is forced back in the retaining groove 33 of the engagement piece 25 of the clutch release bearing 10.

Figure 4C:
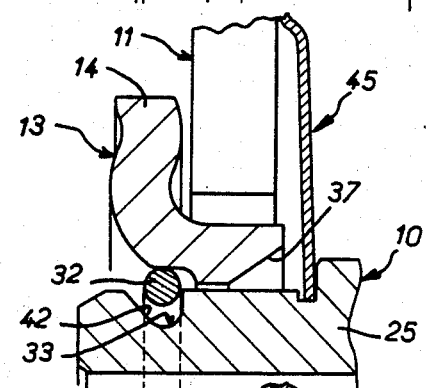

When it arrives in line with the driving bearing surface 34 of the gripping piece 13, it is extended elastically again, FIG. 4C, and thus engages with the said driving bearing surface 34.

In practice, the engagement movement of the clutch release bearing 10 is further continued systematically, to be certain that the fixing ring 32 has in fact extended, but with this engagement movement being limited in such a way that the fixing ring 32 does not escape from the cylindrical bearing surface 36 of the gripping piece 13 which is consequently extended axially to a sufficient extent.

However, at the same time, the elastic washer 45 has been compressed after coming in contact with the disengaging device 11.

Figure 4D:
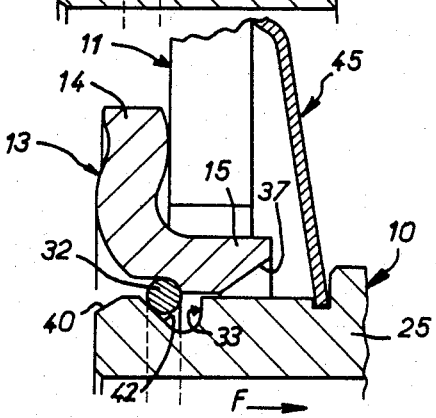

As a result, under the stress of this elastic washer 45, the clutch release bearing 10 is automatically retracted in relation to the gripping piece 13, thus making the oblique flank 42 of the retaining groove 33 of the engagement piece 25 of this clutch release bearing 10 come in contact with the fixing ring 32 and stress the latter obliquely in the direction of the driving bearing surface 34 of the gripping piece 13, FIGS. 4D, 1 and 3.

The desired snapping-in action in ensured reliably in this way.

During operation, when the clutch release bearing 10 exerts according to the arrow F a pull on the gripping piece 13 and by means of this on the disengaging device 10, the oblique flank 42 of the retaining groove 33, in which the fixing ring 32 is engaged, likewise stresses the latter obliquely in the direction of the driving bearing surface 34 of the gripping piece 13, thus confirming the snapping-in previously effected and permitting the control required.

If desired, it is possible to uncouple the clutch release bearing 10 from the gripping piece 13 by acting on the fixing ring 32 so as to force it back again in the retaining groove 33 of the engagement piece 25 of this clutch release bearing 10, for example by means of an annular tool inserted for this purpose between this engagement piece 25 and the casing 15 of this gripping piece 13 on the side of the latter opposite the clutch release bearing 10.

In the alternative embodiment illustrated in FIG. 5, the engagement piece 25 of the clutch release bearing 10 is engaged on the casing 15 of the gripping piece 13, so that the means of fixing in terms of traction, which are used between these pieces, take effect between the inner surface of the said engagement piece 25 and the outer surface of the said casing 15.

However, as before, the retaining groove 33 is provided in the engagement piece 25, whilst the corresponding driving bearing surface 34 is provided on the gripping piece 13.

In practice, this driving bearing surface 34 then preferably forms one of the flanks of a groove 48 made in a cylindrical bearing surface of the engagement piece 25 of the clutch release bearing 10, by means of which the latter can be suitably guided in relation to the gripping piece 13 when it is engaged in this.

In such an alternative embodiment, and conversely to the preceding arrangement, the fixing ring 32 occupies, during operation, a configuration having a diameter greater than that of its configuration of rest, and to pass from this configuration of rest to this operating configuration it is therefore elastically deformed radially in the opposite direction to the axis of the unit as a whole.

Furthermore, in the embodiment illustrated, the casing 15 of the gripping piece 13 possesses radially, in line with the means of fixing in terms of traction formed in this way, at least one passage 52 to allow access to the fixing ring 32.

In practice, several passages 52 are provided in this way on this casing 15, being distributed circularly about the axis of the unit as a whole.

By means of such passages 52, it is possible to act on the ring 32 with a tool shaped for this purpose, in order, if desired, to uncouple the clutch release bearing 10 from the gripping piece 13.

As will be noted, in this case, such uncoupling can be effected even when the clutch mechanism in question is still in place on the reaction plate with which it is associated, on the assumption, of course, that the guide member 23 carrying the clutch release bearing 10 has, in contrast, been removed beforehand.

Moreover, in the embodiment illustrated, the elastic means provided for stressing the fixing ring 32 in the direction of the driving bearing surface 34 of the gripping piece 13 take effect between the end of the engagement piece 25 of the clutch release bearing 10 and the bearing collar 14 of this gripping piece 13, and they consist of an elastic washer 45 which, to keep it in place, is in one piece with a radial collar 53 inserted between the said bearing collar 14 of the gripping piece 13 and the disengaging device 11.

Since this arrangement is not per se part of the present invention, it will not be described in any more detail here.

Finally, in this embodiment, and as will be noted, the axial overhang of the engagement piece 25 of the clutch release bearing 10 is advantageously limited, so that the ball bearing to which this engagement piece belongs can advantageously be of the type used in so-called "pushed" clutch release bearings which are intended for acting by pushing on the disengaging device to be controlled, this being favorable to production standardization.

As will be noted, the flank 43 of the retaining groove 33, which is involved in driving the fixing ring 32 when the engagement piece 25 engages in or on the gripping piece 13, forms an integral part of the engagement piece 25 and is therefore fixed axially relative to this.

In other words, it is rigid.

Moreover, the present invention is not, of course, limited to the embodiments described and illustrated, but embraces any alternative form of execution and/or combination of their various elements.

We claim:

1. A coupling device for coupling a pull-type clutch release bearing to a pull-operated clutch disengagement device having an inner surface, said coupling device comprising a gripping member for operative engagement with the inner surface of the disengaging device, an engagement member forming part of the clutch release bearing and having a rigid portion, a radially deformable annular fixing ring for defining an axial connecting between said gripping member and said engagement member, a radially opening annular retaining groove being defined by the rigid portion of said engagement member, said fixing ring being normally partially received in said retaining groove and retractable into said retaining groove for assembly of the coupling device, said gripping member having a transverse driving bearing surface defining an axial abutment for said fixing ring during clutch operation, said retaining groove having an oblique flank extending radially and axially away from an opposite flank of said retaining groove in the direction of the inner side of said disengaging device, said oblique flank being disposed axially opposite said driving bearing surface in relation to said fixing ring, said fixing ring being axially abuttable against said opposite flank for assembly of the coupling device and axially wedged between said driving bearing surface and said oblique flank during clutch operation.

2. A coupling device according to claim 1, wherein said coupling device has an axis and said oblique flank has a free edge, and said oblique flank is substantially frustoconical from a connecting zone with said opposite flank to said free edge and diverges from the axis of the coupling device as it extends away from said connecting zone.

3. A coupling device according to claim 2, wherein said frustoconical oblique flank slopes at an angle between 30° and 60°.

4. A coupling device according to claim 2, wherein said oblique flank slopes at an angle of about 45°.

5. A coupling device according to claim 1, wherein a bottom wall connects said oblique flank and said opposite flank, said bottom wall being of configuration complementary to that of said fixing ring, said fixing ring being of circular cross section, said oblique flank being tangential to said bottom wall, said fixing ring being cooperable with said bottom wall for assembly of the coupling device.

6. A coupling device according to claim 1, wherein said fixing ring comprises a torus of circular cross section.

7. A coupling device according to claim 1, wherein said gripping piece comprises a collar engaging the inner surface of said disengaging device and a sleeve coaxial with said disengaging device inner surface, said sleeve being a radially outer surface, said engagement member being received radially on said sleeve, said fixing ring being interposed between the inner surface of said engagement member and said radially outer surface of said sleeve.

8. A coupling device according to claim 7, said fixing ring being a torus of circular cross-section, and wherein at least one passage means extends transversely through said sleeve for providing access to said fixing ring to uncouple said clutch release bearing from said gripping member.

9. A coupling device according to claim 8, wherein a plurality of circumferentially spaced passages extend transversely through said sleeve for providing access to said fixing ring.

10. A coupling device according to claim 1, wherein said driving bearing surface has a cross sectional profile complementary to that of said fixing ring.

11. A coupling device according to claim 1, wherein said opposite flank lies generally in a radial plane.

12. A coupling device according to claim 1, further comprising axially acting spring means bearing against said engagement member and ensuring cooperation between said gripping member and said disengagement device.

13. An assembly of a pull-type clutch release bearing and a pull-operated clutch disengagement device, said disengaging device having an inner side, said assembly comprising a coupling device comprising a gripping member for operative engagement with the inner side of said disengaging device, an engagement member forming part of said clutch release bearing, a radially deformable annular fixing ring for defining an axial connecting between said gripping member and said engagement member, said engagement member having a rigid portion, a radially opening annular retaining groove being defined by the rigid portion of said engagement member, said fixing ring being internally biased to its coupling position in which it is partially received in said retaining groove and retractable into said groove for assembling said coupling device, said gripping member having a transverse driving bearing surface defining an axial abutment for said fixing ring during clutch operation, said retaining groove having an oblique flank extending radially and axially away from an opposite flank of said retaining groove in the direction of the inner side of said disengaging device, said oblique flank being disposed axially opposite said driving bearing surface in relation to said fixing ring, said fixing ring being axially abuttable against said opposite flank for assembling said coupling device and being axially wedged between said driving bearing surface and said oblique flank during clutch operation.

* * * * *